United States Patent
Kaiser et al.

(10) Patent No.: US 10,268,671 B2
(45) Date of Patent: Apr. 23, 2019

(54) GENERATING PARSE TREES OF TEXT SEGMENTS USING NEURAL NETWORKS

(71) Applicant: Google LLC, Mountain View, CA (US)

(72) Inventors: Lukasz Mieczyslaw Kaiser, Mountain View, CA (US); Oriol Vinyals, London (GB)

(73) Assignee: Google LLC, Mountain View, CA (US)

( * ) Notice: Subject to any disclaimer, the term of this patent is extended or adjusted under 35 U.S.C. 154(b) by 52 days.

(21) Appl. No.: 15/396,091

(22) Filed: Dec. 30, 2016

(65) Prior Publication Data

US 2017/0192956 A1   Jul. 6, 2017

Related U.S. Application Data

(60) Provisional application No. 62/273,911, filed on Dec. 31, 2015.

(51) Int. Cl.
| | |
|---|---|
| G06F 17/00 | (2006.01) |
| G06F 17/27 | (2006.01) |
| G10L 25/30 | (2013.01) |
| G06N 3/04 | (2006.01) |

(52) U.S. Cl.
CPC ......... *G06F 17/271* (2013.01); *G06N 3/0445* (2013.01); *G10L 25/30* (2013.01)

(58) Field of Classification Search
CPC ............... G06N 3/084; G06F 17/2705; G06F 17/30684; G06F 17/2247; G06F 17/271; G06F 27/2735; G06F 17/279; G06F 17/30011; G06F 17/30401; G06F 17/30707; G06F 17/30958; G06K 9/00422; G06K 9/00463

See application file for complete search history.

(56) References Cited

U.S. PATENT DOCUMENTS

| | | | |
|---|---|---|---|
| 2015/0066496 A1* | 3/2015 | Deoras | G10L 15/16 704/232 |
| 2016/0180215 A1* | 6/2016 | Vinyals | G06N 3/088 706/20 |
| 2018/0204120 A1* | 7/2018 | Rei | G06N 3/0445 |

OTHER PUBLICATIONS

Li et al., Improvement of n-ary Relation Extraction by Adding Lexical Semantics to Distant-Supervision Rule Learning ICAART 2015—Proceedings of the 7th International Conference on Agents and Artificial Intelligence, Lisbon, Portugal, SciTePress, 2015.*
Bandanau et al. "Neural machine translation by jointly learning to align and translate," arXiv preprint arXiv 1409.0473v1, Sep. 1, 2014, 15 pages.

(Continued)

*Primary Examiner* — Edgar X Guerra-Erazo
(74) *Attorney, Agent, or Firm* — Fish & Richardson P.C.

(57) ABSTRACT

Methods, systems, and apparatus, including computer programs encoded on computer storage media, for generating parse trees for input text segments. One of the methods includes obtaining an input text segment comprising a plurality of inputs arranged according to an input order; processing the inputs in the input text segment using an encoder long short term memory (LSTM) neural network to generate a respective encoder hidden state for each input in the input text segment; and processing the respective encoder hidden states for the inputs in the input text segment using an attention-based decoder LSTM neural network to generate a linearized representation of a parse tree for the input text segment.

18 Claims, 3 Drawing Sheets

(56) References Cited

OTHER PUBLICATIONS

Chorowski et al. "End-to-end continuous speech recognition using attention-based recurrent neural nn: First results," arXiv preprint arXiv 1412.1602v1, Dec. 4, 2014, 10 pages.
Collins et al. "Incremental parsing with the perceptron algorithm," Proceedings of the 42$^{nd}$ Meeting of the ACL, Main Volume, Jul. 2004, 8 pages.
Collins et al. "Three generative lexicalised models for statistical parsing," Proceedings of the 35$^{th}$ Annual Meeting of the ACL, Jul. 1997, 8 pages.
Collobert. "Deep learning for efficient discriminative parsing," International Conference on Artificial Intelligence and Statistics, Jun. 14, 2011, 9 pages.
Klein et al. "Accurate unlexicalized parsing," Proceedings of 41$^{st}$ Annual Meeting of the ACL, Jul. 7, 2003, 8 pages.
Graves. "Generating sequences with recurrent neural networks," arXiv preprint arXiv 1308.0850v5, Jun. 5, 2014, 43 pages.
Graves. "Generating sequences with recurrent neural networks," arXiv preprint arXiv1308.0850v1, May 26, 2013, 43 pages.
Hall et al. "Sparser, better, faster gpu parsing," ACL, Apr. 21, 2014, 10 pages.
Henderson. "Discriminative training of a neural network statistical parser," Proceedings of the 42nd Meeting of the ACL, Main volume, Jul. 21, 2004, 8 pages.
Hochreiter et al. "Long short-term memory," Neural computation, 9(8) 1997, 46 pages.
Hovy et al. "Ontonotes: The 90% solution," Proceedings of the Human Language Technology Conference of the NAACL, Short Papers,, Jun. 2006, 4 pages.
Huang et al. "Self-training PCFG grammars with latent annotations across languages," Proceedings of the 2009 Conference on Empirical Methods in Natural Language Processing, Aug. 6, 2009, 10 pages.
Huang et al. "Self-training with products of latent variable grammars," Proceedings of the 2010 Conference on Empirical Methods in Natural Language Processing, Oct. 9, 2010, 11 pages.
Jean et al. "On using very large target vocabulary for neural machine translation," arXiv preprint arXiv 1412.2007v1, Dec. 5, 2014, 10 pages.
Judge et al. "Questionbank: Creating a corpus of parse-annotated questions," Proceedings of ICCL & ACL, Jul. 2006, 8 pages.
Kalchbrenner et al. "Recurrent continuous translation models," EMNLP, 3(39), Oct. 1, 2013, 10 pages.
Li et al. "Ambiguity-aware ensemble training for semi-supervised dependency parsing," Proceedings of ACL, Jun. 2014, 11 pages.
Luong et al. "Addressing the rare word problem in neural machine translation," arXiv preprint arXiv 1410.8206, Oct. 30, 2014, 11 pages.
Marcus et al. "Building a large annotated corpus of English: The penn treebank," Computational Linguistics, 19(2), Oct. 1993, 25 pages.
McClosky et al. "Effective self-training for parsing," Proceedings of the Human Language Technology Conference of the NAACL, Main Conference, ACL, Jun. 2006, 8 pages.
Mikolov et al. "Efficient estimation of word representations in vector space," arXiv preprint arXiv1301.3781v3, Sep. 7, 2013, 12 pages.
Petrov et al. "Learning accurate, compact, and interpretable tree annotation," Proceedings of the 21$^{st}$ International Conference on Computational Linguistics and 44$^{th}$ Annual Meeting of the ACL, Jul. 17, 2006, 8 pages.
Petrov et al. "Overview of the 2012 shared task on parsing the web," Notes of the First Workshop on Syntactic Analysis of Non-Canonical Language, 2012, 8 pages.
Petrov. "Products of random latent variable grammars," Human Language Technologies: The 2010 Annual Conference of the North American Chapter of the ACL, Jun. 2, 2010, 9 pages.
Ratnaparkhi. "A linear observed time statistical parser based on maximum entropy models," In Second Conference on Empirical Methods in Natural Language Processing, Jun. 1997, 10 pages.
Socher et al. "Parsing natural scenes and natural language with recursive neural networks," Proceedings of the 28$^{th}$ International Conference on Machines Learning, 2011, 8 pages.
Sutskever et al. "Sequence to sequence learning with neural networks," Advances in Neural Information Processing Systems, 2014, 9 pages.
Titov et al. "Constituent parsing with incremental sigmoid belief networks," Proceedings of the 45$^{th}$ Annual Meeting of the Association of Computational Linguistics, Jun. 2007, 8 pages.
Vinyals et al. "Grammar as a Foreign Language," arXiv preprint arXiv 1412.7449v1, Dec. 23, 2014, 12 pages.
Vinyals et al. "Show and tell: A neural image caption generator," arXiv preprint arXiv1411.4555v1, Nov. 17, 2014, 9 pages.
Zhu et al. "Fast and accurate shift-reduce constituent parsing," Proceedings of the 51$^{st}$ Annual Meeting of the ACL (vol. 1: Long Papers), Aug. 2013, 10 pages.

* cited by examiner

FIG. 3

GENERATING PARSE TREES OF TEXT SEGMENTS USING NEURAL NETWORKS

CROSS-REFERENCE TO RELATED APPLICATIONS

This application claims the benefit under 35 U.S.C. § 119(e) of U.S. Patent Application No. 62/273,911, entitled "GENERATING PARSE TREES OF TEXT SEGMENTS USING NEURAL NETWORKS," filed Dec. 31, 2015. The disclosure of the foregoing application is incorporated herein by reference in its entirety for all purposes.

BACKGROUND

This specification relates to generating parse trees for text segments using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can generate a parse tree for an input text segment using long short-term memory (LSTM) neural networks. Generally, the parse tree is a tree that represents the syntactic structure of the text segment according to a context-free grammar.

Particular embodiments of the subject matter described in this specification can be implemented so as to realize one or more of the following advantages. Neural networks can be effectively used for a syntactic constituency parsing task, even though this task requires modeling complex relations between input words and producing trees as the output. LSTM neural networks are able to automatically learn the complex syntactic relationships between the input and output pairs, which had typically been manually engineered into prior parsing models. In particular, parse trees can be generated without binarizing the parse trees or using any special handling for unary productions or unknown words, which are simply mapped to a single unknown word token. Additionally, a system employing an attention-based decoder LSTM neural network can realize improved performance and generate more accurate parse trees as compared to a system employing a non-attention-based decoder LSTM neural network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
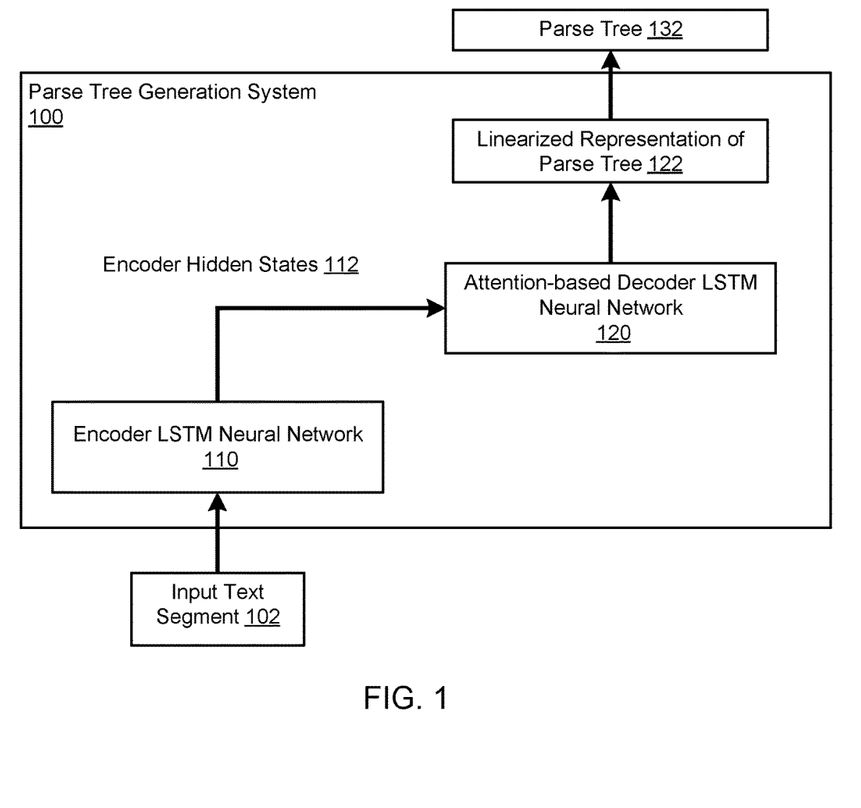
FIG. 1 shows an example parse tree generation system.

FIG. 1 shows an example parse tree generation system 100. The parse tree generation system 100 is an example of a system implemented as computer programs on one or more computers in one or more locations, in which the systems, components, and techniques described below can be implemented.

The parse tree generation system 100 receives input text segments and generates a respective parse tree, i.e., a syntactic constituency parse tree, for each input text segment. Each input text segment is a sequence of words and, optionally, punctuation marks in a particular natural language, e.g., a sentence, a sentence fragment, or another multi-word sequence. The parse tree for a given text segment is a tree that represents the syntactic structure of the text segment according to a context-free grammar.

For example, the parse tree generation system 100 can receive an input text segment 102 and generate a parse tree 132 for the input text segment 102. Generally, the input text segments obtained by the parse tree generation system 100 can be sequences of varying lengths. That is, the parse tree generation system 100 can be configured to receive text segments that have varying numbers of words and punctuation marks.

The parse tree generation system 100 includes an encoder long short-term memory (LSTM) neural network 110 and an attention-based decoder LSTM neural network 120.

As part of generating a parse tree from an input text segment, the parse tree generation system 100 processes the input text segment using the encoder LSTM neural network 110 to generate a respective encoder hidden state for each input in the input text segment, e.g., a set of hidden states 112 for the inputs in the input text segment 102.

The encoder LSTM neural network 110 is an LSTM neural network that includes one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network 110. An example LSTM neural network is described in more detail in "Generating sequences with recurrent neural networks," Alex Graves, available at http://arxiv.org/abs/1308.0850v5. In some implementations, the encoder LSTM neural network is a deep LSTM neural network.

The encoder LSTM neural network 110 has been configured, e.g., through training, to process each input in a given input text segment to generate the hidden states for the inputs in the input text segment in accordance with a set of parameters. In particular, the encoder LSTM neural network 110 is configured to receive each input in the input text segment in order, i.e., in the input order or arranged in another order, and, for a given received input, to update the current hidden state of the encoder LSTM neural network 110 by processing the received input, i.e., to modify the current hidden state of the encoder LSTM neural network 110 that has been generated by processing previous inputs from the input text segment by processing the current received input. The updated encoder hidden state after processing a given input will be referred to in this specification as the encoder hidden state for the given input.

The parse tree generation system 100 processes the encoder hidden states for the input text segment using the attention-based decoder LSTM neural network 120 to generate a linearized representation of the parse tree for the input text segment. For example, the parse tree generation system 100 can process the encoder hidden states 112 using the attention-based decoder LSTM neural network 120 to generate the linearized representation 122 for the input text segment 102.

A linearized representation of a parse tree is a sequence of symbols from a pre-determined vocabulary of parse tree symbols that collectively represents the parse tree. In particular, the vocabulary of parse tree symbols includes symbols that represent a portion of a parse tree, e.g., part of speech tags, symbols that determine hierarchical relationships between other symbols in the sequence, and so on. In some implementations, the symbols also include an unknown word symbol that represents an unknown word. A linearized representation can be generated from a parse tree by adding the symbols in the parse tree to the sequence in depth-first traversal order.

In some implementations, the parse tree generation system 100 then generates the parse tree 132 from the linearized representation 122, i.e., by adding the symbols in the linearized representation 122 to a parse tree in depth-first traversal order and generating levels in the tree to match the hierarchical relationships specified by the symbols in the sequence, and then provides the parse tree 132 for presentation to a user or stores the parse tree 132 in association with the text segment 102. In some other implementations, the parse tree generation system 100 stores the linearized representation 122 in association with the text segment 102, i.e., without generating the parse tree 132.

In some implementations, the parse tree generation system 100 provides either the parse tree 132 or the linearized representation 122 as input to another system for further processing. For example, the parse tree generation system 100 can provide the parse tree 132 or the linearized representation 122 as input to a natural language processing system that analyzes the input text segment 102, e.g., performs sentiment analysis, question answering, summarization, or another natural language processing task.

The attention-based decoder LSTM neural network 120 is an LSTM neural network that includes one or more LSTM layers and that is configured to receive a current symbol in a linearized representation and the encoder hidden states and to generate a respective output score for each of a set of possible outputs from the current symbol and in accordance with the current hidden state of the attention-based decoder LSTM neural network 120 and current values of a set of parameters. In some implementations, the attention-based decoder LSTM neural network is a deep LSTM neural network. The output score for a given symbol represents the likelihood that the symbol is the next symbol in the linearized representation, i.e., that the symbol immediately follows the current symbol in the linearized representation. As part of generating the output scores, the attention-based decoder LSTM neural network 120 also updates the hidden state of the network to generate an updated hidden state.

Generally, for each position in the output order, the attention-based LSTM neural network 120 is configured to process a current symbol and the encoder hidden states to generate an attention vector over the encoder hidden states for the inputs and to process the attention vector to generate the set of output scores for the position.

The parse tree generation system 100 then selects a symbol for the position in the output order in accordance with the output scores, i.e., by selecting the symbol that has the highest output score.

Generating the output scores for a given position in the output order is described in more detail below with reference to FIG. 3.

The parse tree generation system 100 continues to select outputs for the sequence until the selected symbol is a predetermined output that is not in the vocabulary, i.e., a symbol that is included in the set of possible outputs but that is not one of the parse tree symbols. In response, the parse tree generation system 100 determines not to generate any additional outputs for the linearized representation and selects the outputs before the selected output as the linearized representation.

Figure 2:
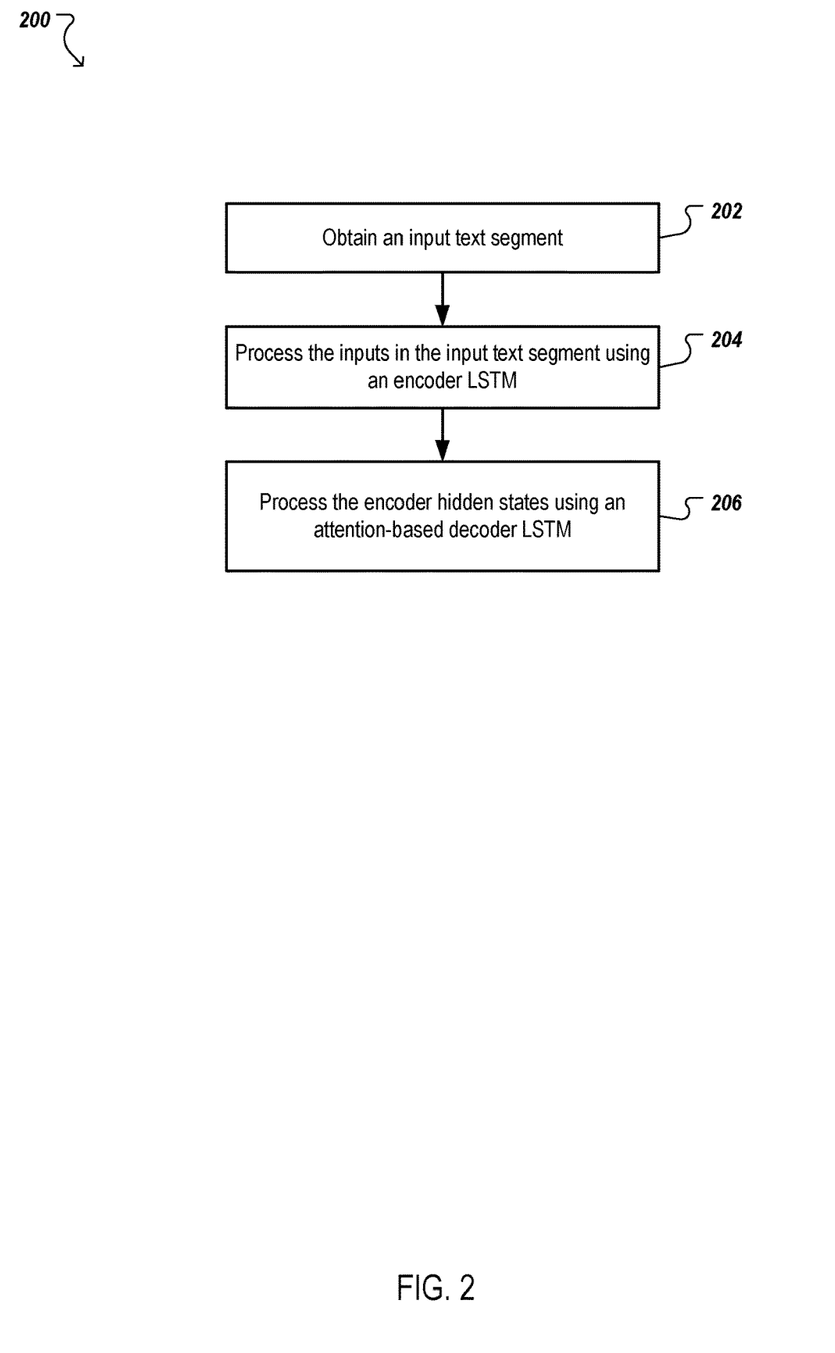
FIG. 2 is a flow diagram of an example process for generating a linearized representation of a parse tree for an input text sequence.

FIG. 2 is a flow diagram of an example process 200 for generating a linearized representation of a parse tree for an input text sequence. For convenience, the process 200 will be described as being performed by a system of one or more computers located in one or more locations. For example, a parse tree generation system, e.g., the parse tree generation system 100 of FIG. 1, appropriately programmed, can perform the process 200.

The system obtains an input text segment (step 202). The input text segment includes multiple inputs, i.e., words and, optionally, punctuation marks, arranged according to an input order.

The system processes the inputs in the input text segment using an encoder LSTM neural network (step 204). As described above, the encoder LSTM neural network is configured to process each input in the input text segment to generate a respective encoder hidden state for each of the inputs in the input text segment by updating a current hidden state of the encoder LSTM neural network.

The system processes the encoder hidden states using an attention-based decoder LSTM neural network to generate a linearized representation of a parse tree for the input text segment (step 206). The linearized representation is a sequence of symbols from a predetermined vocabulary of parse tree symbols arranged according to an output order.

To generate the symbol at a given position in the output order, the attention-based decoder LSTM neural network is configured to process a current symbol to generate an attention vector over the encoder hidden states for the inputs and to process the attention vector to generate a set of output scores for the position. The system then selects one of the symbols in the vocabulary as the symbol at the given position in the output order in accordance with the output scores, i.e., the symbol having the highest output score.

Generating a set of output scores for a position in the output order is described in more detail below with reference to FIG. 3.

The system continues to select symbols for positions in the sequence until the selected symbol for one of the positions is the predetermined output that is not in the vocabulary. In response, the system determines not to generate any additional symbols for the linearized representation and selects the symbols before the predetermined output that is not in the vocabulary as the linearized representation.

Figure 3:
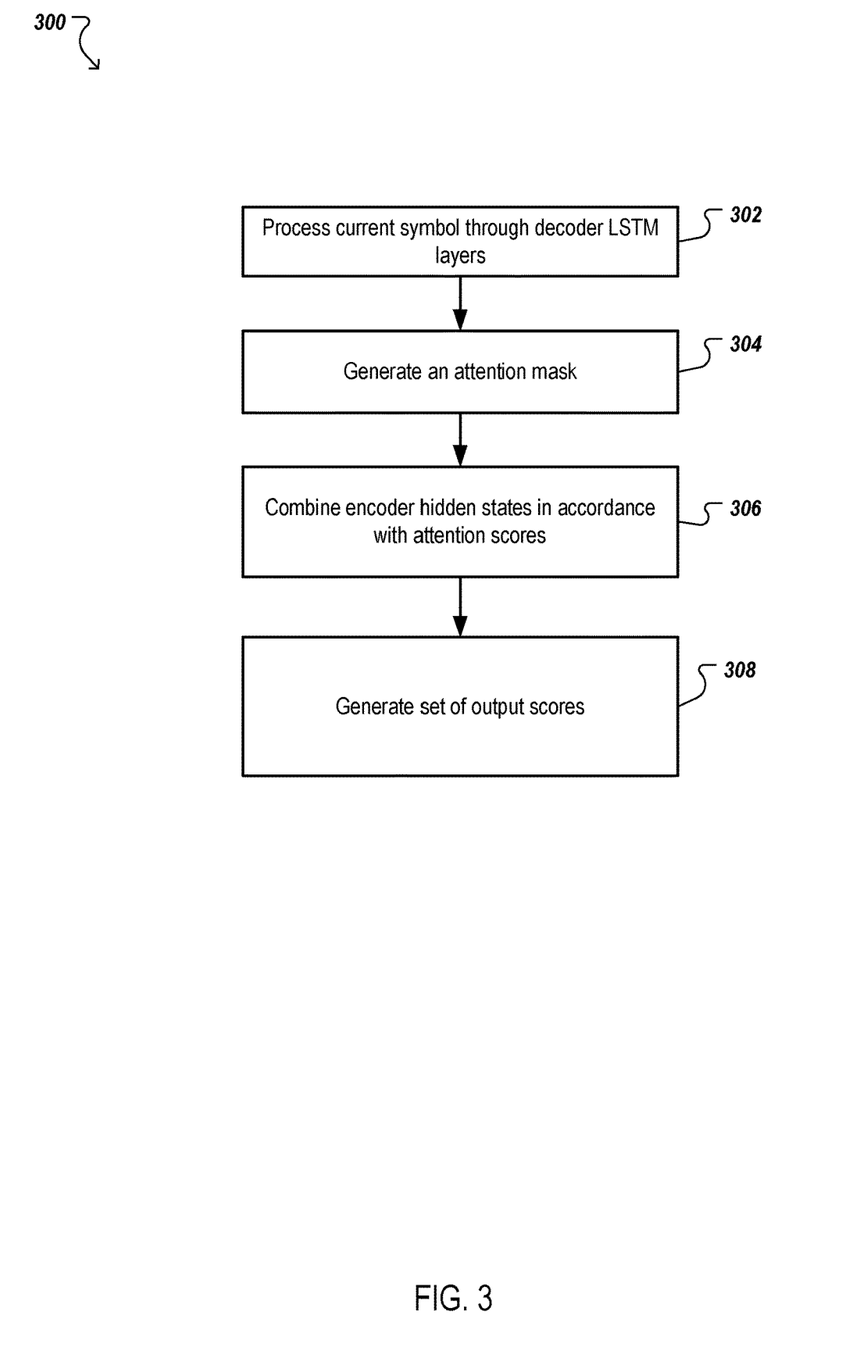
FIG. 3 is a flow diagram of an example process for generating a set of output scores for a position in the output order.

FIG. 3 is a flow diagram of an example process 300 for generating a set of output scores for a given position in the output order. For convenience, the process 300 will be described as being performed by a system of one or more computers located in one or more locations. For example, a parse tree generation system, e.g., the parse tree generation system 100 of FIG. 1, appropriately programmed, can perform the process 300.

The system processes a current symbol through one or more decoder LSTM layers to update a current decoder hidden state of the attention-based decoder LSTM neural network to generate an initial updated decoder hidden state for the position (step 302).

For positions after the first position in the output order, the current symbol is the symbol at the position that immediately precedes the given position in the output order. For the first position, the current symbol is a predetermined placeholder symbol.

In some implementations, for the first position in the output order, the system initializes the current decoder hidden state using a final encoder hidden state. In particular, in some implementations, when processing the inputs in the input text segment using the encoder LSTM neural network, the system reverses the input order and processes the inputs in the input text segment using the encoder LSTM neural network according to the reversed input order. In these implementations, the final encoder hidden state is the encoder hidden state for the last input according to the reversed input order. In some other implementations, when processing the inputs in the input text segment using the encoder LSTM neural network, the system processes the inputs in the input text segment using the encoder LSTM neural network according to the input order. In these implementations, the final encoder hidden state is the encoder hidden state for the last input in the input order.

In some other implementations, for the first position in the output order, the system initializes the current decoder hidden state to a predetermined or learned initial state.

The system generates an attention mask for the position in the output order from the initial updated decoder hidden state for the position and the encoder hidden states (step 304). The attention mask includes a respective attention score for each of the encoder hidden states.

In particular, to generate the attention mask, for each encoder hidden state, the system combines the encoder hidden state and the initial updated decoder hidden state to generate an initial attention score for the encoder hidden state.

To generate the initial attention score for a given encoder hidden state, the system applies an encoder parameter matrix to the encoder hidden state to generate an encoder vector and applies a decoder parameter matrix to the initial updated decoder hidden state to generate a decoder vector. The system then sums the encoder vector and the decoder vector and applies an element-wise non-linear activation function, e.g., inverse tangent, to the sum to generate a transformed vector. The system then multiplies a reduction matrix by the transformed vector to reduce the transformed vector to the initial attention score.

The system then normalizes the initial attention scores by applying a softmax function to the initial attention scores to generate the attention scores for the encoder hidden states.

The system combines the encoder hidden states for the inputs in the input text segment in accordance with the attention scores to generate an attention vector (step 306). For example, the system can generate the attention vector by computing a weighted sum of the encoder hidden states, with the weight for each encoder hidden state being the attention score for the encoder hidden state.

The system generates the set of output scores for the position using the attention vector for the position and the initial updated decoder hidden state (step 308).

In particular, the system combines, e.g., concatenates, averages, or sums, the attention vector with the initial updated decoder hidden state to generate a final updated decoder hidden state, i.e., the updated decoder hidden state that will be used as the current decoder hidden state for the next position in the output order.

The system generates the set of output scores from the final updated decoder hidden state. For example, the system can apply a parameter matrix to the final updated decoder hidden state and then apply a softmax function to the result to generate the set of output scores.

In some implementations, the system performs a beam search decoding to generate a respective sequence score for each of multiple possible linearized representations of parse trees and selects a possible linearized representation having a highest sequence score as the linearized representation of the parse tree for the input text segment.

The system can perform the processes 200 and 300 for text sequences for which the desired output, i.e., the linearized representation that should be generated by the system for the input sequence, is not known. The system can also perform the processes 200 and 300 on text sequences in a set of training data, i.e., a set of inputs for which the linearized representation that should be predicted by the system is known, in order to train the encoder LSTM neural network and the attention-based decoder LSTM neural network, i.e., to determine trained values for the parameters of the encoder LSTM neural network and the attention-based decoder LSTM neural network. Because the components of the system are entirely differentiable, the processes 200 and 300 can be performed repeatedly on inputs selected from a set of training data as part of a conventional machine learning training technique to train the neural networks, e.g., a backpropagation through time training technique.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   obtaining an input text segment comprising a plurality of inputs arranged according to an input order;
   processing the inputs in the input text segment using an encoder long short term memory (LSTM) neural network to generate a respective encoder hidden state for each input in the input text segment; and
   processing the respective encoder hidden states for the inputs in the input text segment using an attention-based decoder LSTM neural network to generate a linearized representation of a parse tree for the input text segment,
   wherein the linearized representation of the parse tree for the input text segment is a sequence of symbols from a predetermined vocabulary of parse tree symbols arranged according to an output order, each input corresponds to one or more symbols from the sequence of symbols, and
   wherein the encoder LSTM neural network and the attention-based decoder LSTM neural network have been trained using a backpropagation through time training technique on training data that includes a set of training text segments and, for each training text segment, a respective known linearized representation of a known parse tree for the training text segment, wherein the respective known linearized representation is a training sequence of symbols from the predetermined vocabulary of symbols that represents the known parse tree.

2. The method of claim 1, wherein, for each position in the output order, the attention-based LSTM neural network is configured to process a current symbol to generate an attention vector over the encoder hidden states for the inputs and to process the attention vector to generate a set of output scores for the position.

3. The method of claim 1, wherein, for a first position in the output order the current symbol is a placeholder input and, for each other position in the output order, the current symbol is the symbol at the preceding position in the output order in the sequence of symbols.

4. The method of claim 1, wherein the set of output scores includes a respective score for each of the symbols in the predetermined vocabulary and a score for a predetermined output that is not in the predetermined vocabulary.

5. The method of claim 4, wherein processing the respective encoder hidden states for the inputs in the text segment using the attention-based decoder LSTM neural network comprises, for each position in the output order:
   processing the current output through one or more decoder LSTM layers to update a current decoder hidden state of the attention-based decoder LSTM neural network to generate an initial updated decoder hidden state for the position in the output order;
   generating an attention mask for the position in the output order from the initial updated decoder hidden state for the position and the encoder hidden states for the inputs in the input text segment, wherein the attention mask includes a respective attention score for each of the encoder hidden states;
   combining the encoder hidden states for the inputs in the input text segment in accordance with the attention scores to generate the attention vector for the position;
   generating the set of output scores for the position in the output order using the attention vector for the position and the initial updated decoder hidden state for the position in the output order; and
   selecting an output for the position in the output order in accordance with the output scores.

6. The method of claim 5, further comprising, for the first position in the output order, initializing the current decoder hidden state using a final encoder hidden state.

7. The method of claim 6, wherein processing the inputs in the input text segment using the encoder LSTM neural network comprises:
   reversing the input order; and
   processing the inputs in the input text segment using the encoder LSTM neural network according to the reversed input order, and wherein the final encoder hidden state is the encoder hidden state for the last input according to the reversed input order.

8. The method of claim 6, wherein processing the inputs in the input text segment using the encoder LSTM neural network comprises:
   processing the inputs in the input text segment using the encoder LSTM neural network according to the input order, and wherein the final encoder hidden state is the encoder hidden state for the last input in the input order.

9. The method of claim 5, wherein generating the set of output scores for the position in the output order using the attention vector for the position and the initial updated decoder hidden state for the position in the output order comprises:
   generating a final updated decoder hidden state for the position from the attention vector and the initial updated decoder hidden state; and
   generating the output scores from the final updated decoder hidden state for the position.

10. The method of claim 5, wherein processing the respective encoder hidden states for the inputs in the text segment using the attention-based decoder LSTM neural network comprises, for a last position in the output order:
    determining that the selected output is the predetermined output that is not in the vocabulary and, in response, determining not to generate any additional outputs for the linearized representation and selecting the outputs before the last position in the output order as the linearized representation.

11. The method of claim 1, further comprising:
    generating the parse tree for the input text segment from the linearized representation of the parse tree.

12. The method of claim 1, wherein the input text segment is a variable length input text segment.

13. The method of claim 1, wherein the parse tree is a tree that represents the syntactic structure of the text segment according to a context-free grammar, and wherein a linearized representation of a particular parse tree is generated by traversing the particular parse tree in a depth-first traversal order.

14. The method of claim 1, wherein each input in the text segment is either a word or a punctuation mark from the text segment.

15. A system comprising one or more computers and one or more storage devices storing instructions that, when executed by the one or more computers, cause the one or more computers to perform operations comprising:
obtaining an input text segment comprising a plurality of inputs arranged according to an input order;
processing the inputs in the input text segment using an encoder long short term memory (LSTM) neural network to generate a respective encoder hidden state for each input in the input text segment; and
processing the respective encoder hidden states for the inputs in the input text segment using an attention-based decoder LSTM neural network to generate a linearized representation of a parse tree for the input text segment,
wherein the linearized representation of the parse tree for the input text segment is a sequence of symbols from a predetermined vocabulary of parse tree symbols arranged according to an output order, each input corresponds to one or more symbols from the sequence of symbols, and
wherein the encoder LSTM neural network and the attention-based decoder LSTM neural network have been trained using a backpropagation through time training technique on training data that includes a set of training text segments and, for each training text segment, a respective known linearized representation of a known parse tree for the training text segment, wherein the respective known linearized representation is a training sequence of symbols from the predetermined vocabulary of symbols that represents the known parse tree.

16. The system of claim 15, wherein, for each position in the output order, the attention-based LSTM neural network is configured to process a current symbol to generate an attention vector over the encoder hidden states for the inputs and to process the attention vector to generate a set of output scores for the position.

17. The system of claim 16, wherein processing the respective encoder hidden states for the inputs in the text segment using the attention-based decoder LSTM neural network comprises, for each position in the output order:
processing the current output through one or more decoder LSTM layers to update a current decoder hidden state of the attention-based decoder LSTM neural network to generate an initial updated decoder hidden state for the position in the output order;
generating an attention mask for the position in the output order from the initial updated decoder hidden state for the position and the encoder hidden states for the inputs in the input text segment, wherein the attention mask includes a respective attention score for each of the encoder hidden states;
combining the encoder hidden states for the inputs in the input text segment in accordance with the attention scores to generate the attention vector for the position;
generating the set of output scores for the position in the output order using the attention vector for the position and the initial updated decoder hidden state for the position in the output order; and
selecting an output for the position in the output order in accordance with the output scores.

18. One or more non-transitory computer storage media encoded with a computer program product, the computer program product comprising instructions that, when executed by one or more computers, cause the one or more computers to perform operations comprising:
obtaining an input text segment comprising a plurality of inputs arranged according to an input order;
processing the inputs in the input text segment using an encoder long short term memory (LSTM) neural network to generate a respective encoder hidden state for each input in the input text segment; and
processing the respective encoder hidden states for the inputs in the input text segment using an attention-based decoder LSTM neural network to generate a linearized representation of a parse tree for the input text segment,
wherein the linearized representation of the parse tree for the input text segment is a sequence of symbols from a predetermined vocabulary of parse tree symbols arranged according to an output order, each input corresponds to one or more symbols from the sequence of symbols, and
wherein the encoder LSTM neural network and the attention-based decoder LSTM neural network have been trained using a backpropagation through time training technique on training data that includes a set of training text segments and, for each training text segment, a respective known linearized representation of a known parse tree for the training text segment, wherein the respective known linearized representation is a training sequence of symbols from the predetermined vocabulary of symbols that represents the known parse tree.

* * * * *

UNITED STATES PATENT AND TRADEMARK OFFICE
CERTIFICATE OF CORRECTION

PATENT NO. : 10,268,671 B2
APPLICATION NO. : 15/396091
DATED : April 23, 2019
INVENTOR(S) : Kaiser et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this
Nineteenth Day of May, 2020

Andrei Iancu
*Director of the United States Patent and Trademark Office*